United States Patent
Gramespacher et al.

(10) Patent No.: US 7,651,636 B2
(45) Date of Patent: Jan. 26, 2010

(54) NONLINEAR ELECTRICAL MATERIAL FOR HIGH AND MEDIUM VOLTAGE APPLICATIONS

(75) Inventors: Hansjoerg Gramespacher, Niederrohrdorf (CH); Michael Hagemeister, Zurich (CH); Petra Kluge-Weiss, Daettwil (CH); Felix Greuter, Ruetihof (CH); Lise Donzel, Wettingen (CH); Reto Kessler, Zurich (CH)

(73) Assignee: ABB Research Ltd, Zurich (CH)

( * ) Notice: Subject to any disclaimer, the term of this patent is extended or adjusted under 35 U.S.C. 154(b) by 557 days.

(21) Appl. No.: 11/086,907

(22) Filed: Mar. 23, 2005

(65) Prior Publication Data

US 2005/0218380 A1  Oct. 6, 2005

(30) Foreign Application Priority Data

Apr. 6, 2004  (EP) ................... 04405210

(51) Int. Cl.
    *H01C 7/10*  (2006.01)
(52) U.S. Cl. .......... 252/500; 252/518.1; 252/519.1; 338/20; 338/21; 338/22 R; 338/22 SD
(58) Field of Classification Search .......... 252/62.2, 252/511, 506, 519.1, 500, 518.1; 338/20, 338/21, 22 R, 22 SD, 224, 225; 361/127; 29/613; 264/617, 453, 478; 427/8, 58; 428/323, 428/404, 357, 402; 524/430, 432
See application file for complete search history.

(56) References Cited

U.S. PATENT DOCUMENTS

| | | | |
|---|---|---|---|
| 2,796,505 A | | 6/1957 | Bocciarelli |
| 4,297,250 A | * | 10/1981 | Gupta et al. ............. 252/519.3 |
| 4,470,898 A | * | 9/1984 | Penneck et al. ............. 252/511 |
| 4,726,991 A | | 2/1988 | Hyatt et al. |
| 5,294,374 A | * | 3/1994 | Martinez et al. ............ 252/516 |
| 5,781,395 A | | 7/1998 | Hyatt |
| 6,245,439 B1 | * | 6/2001 | Yamada et al. ............. 428/546 |
| 6,469,611 B1 | * | 10/2002 | Kluge-Weiss et al. ......... 338/20 |

FOREIGN PATENT DOCUMENTS

| | | |
|---|---|---|
| DE | 199 19 652 A1 | 11/2000 |
| EP | 0 875 087 B1 | 11/1998 |
| EP | 0 992 042 | 4/2000 |
| EP | 1 274 102 A1 | 1/2003 |
| FR | 2 547 451 | 12/1984 |
| WO | 99/56290 | 11/1999 |
| WO | WO 99/56290 | * 11/1999 |

* cited by examiner

*Primary Examiner*—Stanley Silverman
*Assistant Examiner*—Kallambella Vijayakumar
(74) *Attorney, Agent, or Firm*—Buchanan Ingersoll & Rooney PC

(57) ABSTRACT

The invention relates to a nonlinear electrical material with improved microvaristor filler (1'), to devices and electrical apparatuses comprising such nonlinear electrical material and to a production method thereof. According to invention, the filler (1') comprises larger spherical particles (5) and smaller irregular particles (6) that are arranged interstitially and provide non-point-like and/or multiple contact areas (56, 56a, 56b, 66) owing to their irregular outer shape comprising edges and faces. Embodiments, among other things, relate to: spherical particles (5) being calcinated and broken-up to retain their original shape; irregular, spikly shaped, particles (6) obtained by calcinating or sintering and crushing or fracturing granules or blocks; and addition of a third filler fraction. Advantages, among others, are: higher filler contents, more and more durable inter-particle contacts (56, 56a, 56b, 66), enlarged effective micro-contact area, and improved electrical performance of the nonlinear electrical material.

22 Claims, 3 Drawing Sheets

NONLINEAR ELECTRICAL MATERIAL FOR HIGH AND MEDIUM VOLTAGE APPLICATIONS

TECHNICAL FIELD

The invention relates to the field of high and medium voltage technology and, in particular, to nonlinear electrical materials and devices. The invention is based on a method for producing nonlinear electrical materials, on nonlinear electrical materials and on electric appliances comprising such nonlinear electrical materials according to the preamble of the independent claims.

BACKGROUND OF THE INVENTION

In EP 0 875 087 B1 a varistor material for electrical stress control containing doped zinc oxide (ZnO) filler particles embedded in a polymer matrix is shown. The varistor material is specified such that only round or at least smoothly shaped spheroid particles are used and that a majority of the particles has a maximum dimension of between 5 µm and 100 µm. It is claimed that a favourable nonlinearity is achieved with such filler material and that it is suitable for medium voltage cable terminations and joints.

In FR 2 547 451 a similar varistor material having a majority of doped ZnO filler particles with maximum dimensions larger than 100 µm is disclosed for similar field stress control purposes.

In the EP 1 274 102 A1 a varistor granulate comprising a mixture of varistor particles having different nonlinear current-voltage characteristics is shown.

The invention starts from the state of art as described in EP 0 992 042 (WO 99/56290). The filler material comprises sintered varistor granulate made of doped zinc oxide and having a coarse and a fine fraction of microvaristor particles. The dimensions of the microvaristor particles range from 40 µm to 200 µm, in particular from 90 µm to 160 µm, for the coarse fraction and from 10% to 50% of these values, in particular from 32 µm to 63 µm, for the fine fraction. The fine fraction portion shall be approximately 5 Vol % to 30 Vol % of the coarse fraction portion. This bimodal distribution provides a good density of varistor particles, because all varistor particles are substantially round, consequently the coarse fraction arranges itself in close sphere packing and the fine fraction fills interstices. In addition or alternatively to such a bimodal distribution, the filler comprises electrically conductive particles for improved contacting among the closely packed varistor particles. Thus improved nonlinear electrical properties are achieved, in particular increased nonlinear electrical coefficients, increased power absorption and reduced breakdown field strengths. A third fraction of superfine microvaristor particles having dimensions e.g. below 32 µm may be added to further improve the nonlinear behaviour. However, the sintered varistor granules contain exclusively coarse and fine particles with predominantly spherical shape that are capable of self-arrangement in a close sphere packing. Therefore, each pair of neighbouring particles forms exclusively one single point contact, independent of whether it is a coarse-coarse, coarse-fine or fine-fine particle contact. This strongly delimits the effective contact area and thus the electrical performance. Furthermore, protruding spinel crystals may form on the surface of the microvaristor particles and may act as spacers between the varistor particles thereby blocking their mutual electrical contact.

BRIEF SUMMARY OF THE INVENTION

It is a general object of the invention to provide a composite material showing favourable nonlinear electrical properties and being easy to manufacture, an electrical component comprising such a nonlinear electrical material, a medium or high voltage apparatus comprising such a component, and a method for producing the nonlinear electrical material. This object is achieved according to the invention by the subject-matter as set forth in the independent claims.

In a first aspect the invention consists in a nonlinear electric material comprising a polymeric matrix and a particulate varistor filler in powder form and embedded in the matrix, wherein the filler comprises a first fraction of coarse particles and a second fraction of fine particles, wherein the coarse particles have a larger size than the fine particles and the fine particles can fill interstices formed between the coarse particles, and wherein further the coarse particles in the first fraction have a predominantly spherical shape and the fine particles in the second fraction have irregularly shaped bodies with surfaces comprising edges and/or areal faces for providing non-point-like and/or multiple contact areas of the fine particles with their neighbouring particles. Non-point-like contact area relates to a particle that can touch and electrically connect to neighbouring particles over an extended contacting surface, which is not achievable between two spherical particles. According to the invention, such non-point-like and/or multiple contacts are achieved by providing a bimodal particulate filler mixture comprising larger spherical and smaller irregular microvaristor particles. The irregular shape provides the desired plural point contacts or one- or two-dimensionally extended contacting surfaces which then, when the spherical and irregular particles are mixed and arrange themselves, create extended and/or plural micro-contacts among at least a portion of the immediately neighbouring particles. The small irregular particles allow to achieve higher filler contents, to increase the number of inter-particle contacts, to provide more durable micro-contacts, to substantially enlarge the effective micro-contact area and, as a consequence, to improve the electrical performance of the nonlinear electrical material. On the other hand, the presence of the large spherical particles improves considerably the nonlinearity coefficient of the nonlinear electrical material. Moreover, the presence of the large spherical particles also improves the mixing behaviour and processability during production, especially for high filler content, of the nonlinear electrical material or devices.

In one embodiment the contact areas comprise multiple point contacts and/or at least one edge contact and/or at least one face contact among neighbouring particles. This defines a minimum condition on the number and/or area of micro-contacts that at least a portion of the fine irregular particles can provide when they are mixed with the coarse spherical particles and are altogether embedded in the matrix with sufficient particle filler density.

The embodiments according to claim 3 and 4 have the advantage that spherical, broken-up particles and irregular, fractured particles of smaller size can be produced very economically and in a great variety.

In claim 5 preferable design criteria and additives for the particulate filler material are given. Preferable ranges of particle dimensions and the shape irregularity are given in claim 6 and 7, respectively.

Claims 8-9 relate to electrical components making use of the nonlinear electrical material for dielectric insulation, overvoltage protection and/or field control purposes.

In another aspect the invention consists in a method for producing the nonlinear electrical material, the nonlinear electrical material being formed by embedding a particulate varistor filler in powder form in a polymeric matrix, wherein granules for a first fraction are calcinated and subsequently broken up such that the particles retain their original, predominantly spherical shape, and particles of different fractions are mixed, wherein granules for a second fraction are calcinated and subsequently crushed such that the granules are fractured into irregularly shaped particles, and the spherical particles of the first fraction are selected to have a larger size than the irregular particles of the second fraction such that the irregular particles can fill interstices formed between the spherical particles and can make multiple and/or spatially (one- or two-dimensionally) extended contacts with neighbouring particles.

In one embodiment the spherical particles and the irregular particles are precompounded separately by mixing them separately into two components of a two-component matrix or into two portions of a one-component matrix. Thus very homogenous mixtures for particles having different sizes and shapes and in particular difficult mixing behaviour are achieved.

Claims 14-15 relate to further powder processing steps for improving the electrical performance of the nonlinear electrical material.

Further embodiments, advantages and applications of the invention will become apparent from claims or claim combinations and when consideration is given to the following detailed description.

BRIEF DESCRIPTION OF THE DRAWINGS

Such description makes reference to the annexed drawings, which are schematically showing in FIG. 1a nonlinear electrical composite material comprising a mixture of large and small spherical varistor particles in a polymer matrix (prior art).

In the drawings identical parts are designated by identical reference numerals.

DETAILED DESCRIPTION OF THE INVENTION

Figure 1B:
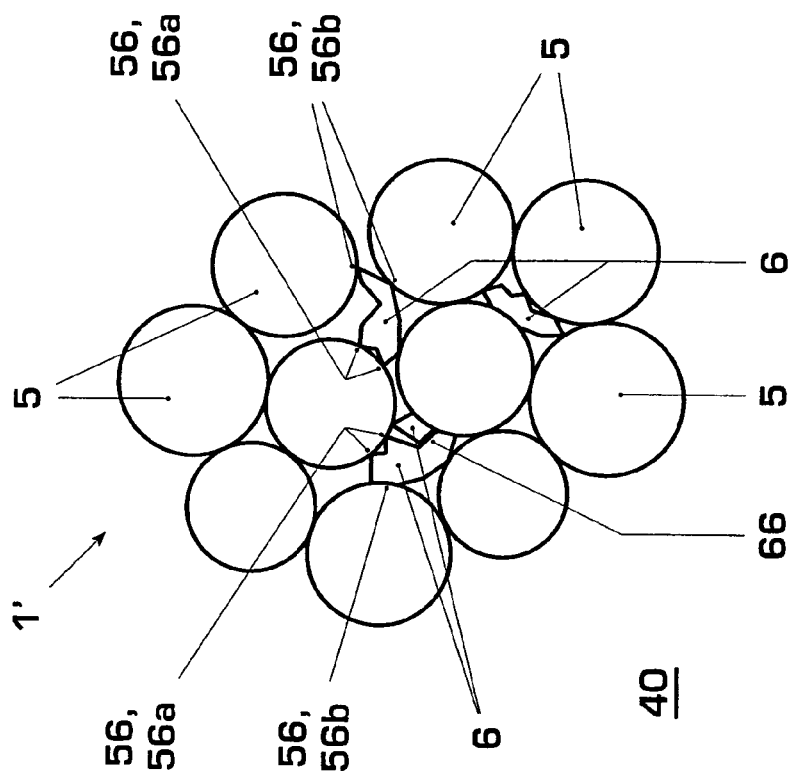
FIG. 1b nonlinear electrical composite material comprising a mixture of large spherical and small irregular varistor particles in a polymer matrix according to invention.
Figure 1A:
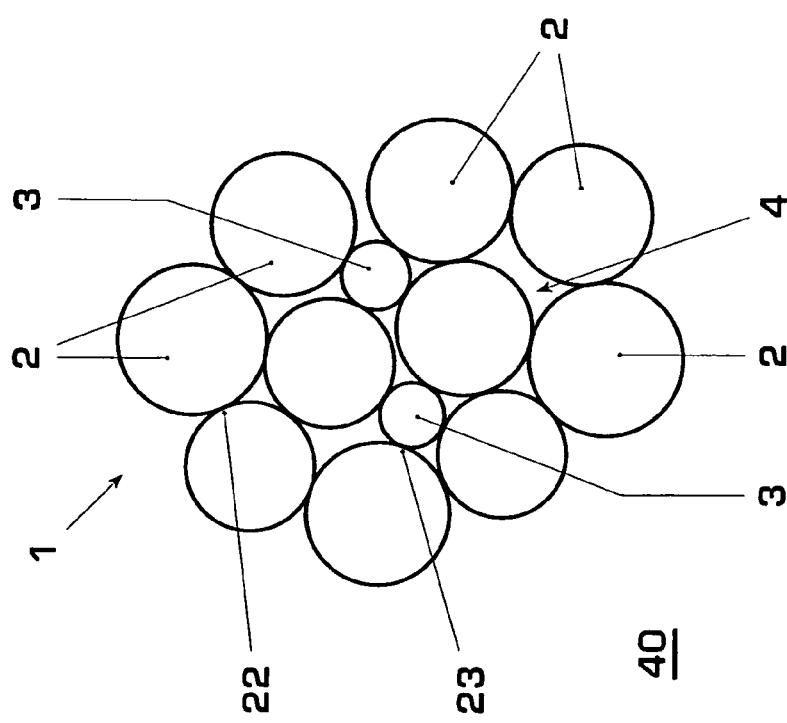

FIG. 1a displays a schematic of a prior art material with a filler 1 which contains exclusively spherical particles 2, 3, namely larger spherical particles 2 and smaller spherical particles 3. The smaller particles 3 are arranged in interstices 4 between the larger particles 2 and form point micro-contacts 23 with neighbouring large particles 2. It is also possible that interstices are filled with several smaller particles 3 that make micro-contacts among themselves 3, as well (not shown). The interstices 4 can also be void or only filled with polymer 40. Immediately neighbouring large particles 2 form large-large particle micro-contacts 22 with each other. The filler particles 2, 3 are embedded in a polymeric matrix 40. All micro-contacts mentioned so far are point contacts 23, 22 that occur between spherically shaped neighbouring particles.

FIG. 1b shows schematically a filler material 1' embedded in the matrix 40 and designed according to invention. The particulate varistor filler 1' comprises a first fraction of coarse particles 5 and a second fraction of fine particles 6. The coarse particles 5 have a larger size than the fine particles 6, such that the fine particles 6 can fill interstices 4 formed between the coarse particles 5. Empty or polymer-filled interstices 4 may occur, as well. The coarse particles 5 have predominantly spherical shapes, whereas the fine particles 6 have irregularly shaped bodies with surfaces comprising edges and/or areal faces that are suitable for providing non-point-like and/or multiple contact areas 56, 56a, 56b, 66 of the fine particles 6 with neighbouring particles 5, 6. In the nonlinear electrical material at least a portion of the fine, irregular particles 6 effectively makes such non-point-like and/or multiple micro-contacts 56, 56a, 56b, 66 with immediate neighbours 5, 6. Preferred embodiments are given below.

FIG. 1b shows between a fine particle 6 and a coarse particle 5 multiple point contacts 56a arising from the particular irregularity or spikiness of the specific fine particle 6. Between another pair of the fine particle 6 and a different coarse particle 5 an edge or face contact 56b is indicated which arises from a smooth, possible slightly concave surface region of the specific fine irregular particle 6. Two fine particles 6, 6 occupying a common interstitial position can as well make point contacts 66 and/or at least one edge contact 66 and/or face contact 66. From these examples it becomes apparent that the irregular or spiky or generally speaking substantially non-spherical fine particles 6 can increase the number of electrical contacts and the effective contact area with neighbouring particles 5, 6. Furthermore, the small irregular particles 6 with sharp edges provide more stable micro-contacts 56, 66 that are less susceptible to degradation over time. Thus the electrical performance of the nonlinear electrical material is improved. The fraction of large spherical particles 5 is essential to achieve a high nonlinearity. Large irregular particles 5 of the same size would not give as good nonlinear electrical properties. For example, a compound comprising doped zinc oxide filler 1' embedded in a silicone matrix with the filler 1', according to invention, consisting of 60% large spherical particles 5 with diameters ranging from 100 μm-160 μm and 40% small irregular particles 6 with dimensions smaller than 60 μm has a nonlinearity coefficient $\alpha_B \geq 25$. In contrast, a compound comprising doped zinc oxide filler embedded in a silicone matrix with 60% large irregular particles with diameters ranging from 100 μm-160 μm and 40% small irregular particles with dimensions smaller than 60 μm only has an $\alpha_B = 15$. The nonlinearity coefficient $\alpha_B$ is defined as the slope of the voltage-current characteristic, measured on the compound, in double logarithmic scale for a current density of $1.3 \cdot 10^{-4}$ A/cm$^2$.

Figure 2:
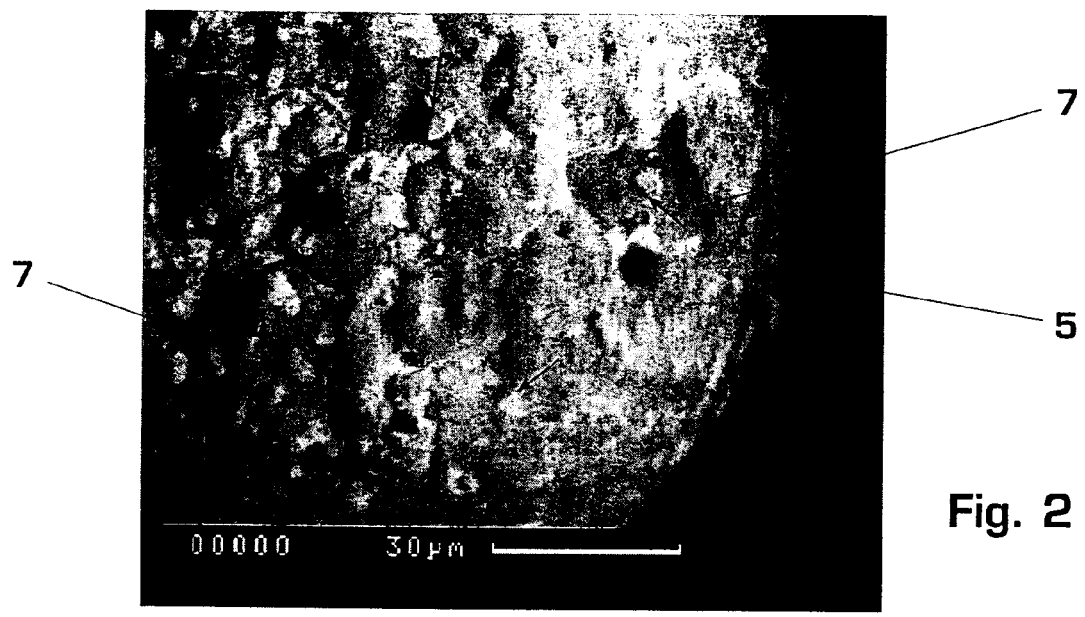
FIGS. 2, 3 scanning electron microscope photographies of a large spherical varistor particle (FIG. 2) and of a plurality of small irregular varistor particles (FIG. 3)

FIG. 2 shows a scanning electron microscope photography of a large spherical particle 5 of the first fraction. It has been produced by calcinating doped zinc oxide powder and subsequently separating, in particular breaking up, the agglomerated particles 5 with little force, such that the particles 5 retain their original, essentially round shape. Preferably, the particles 5 of the first fraction have diameters in a range of 90 μm to 160 μm, in particular 100 μm to 150 μm.

Figure 3:
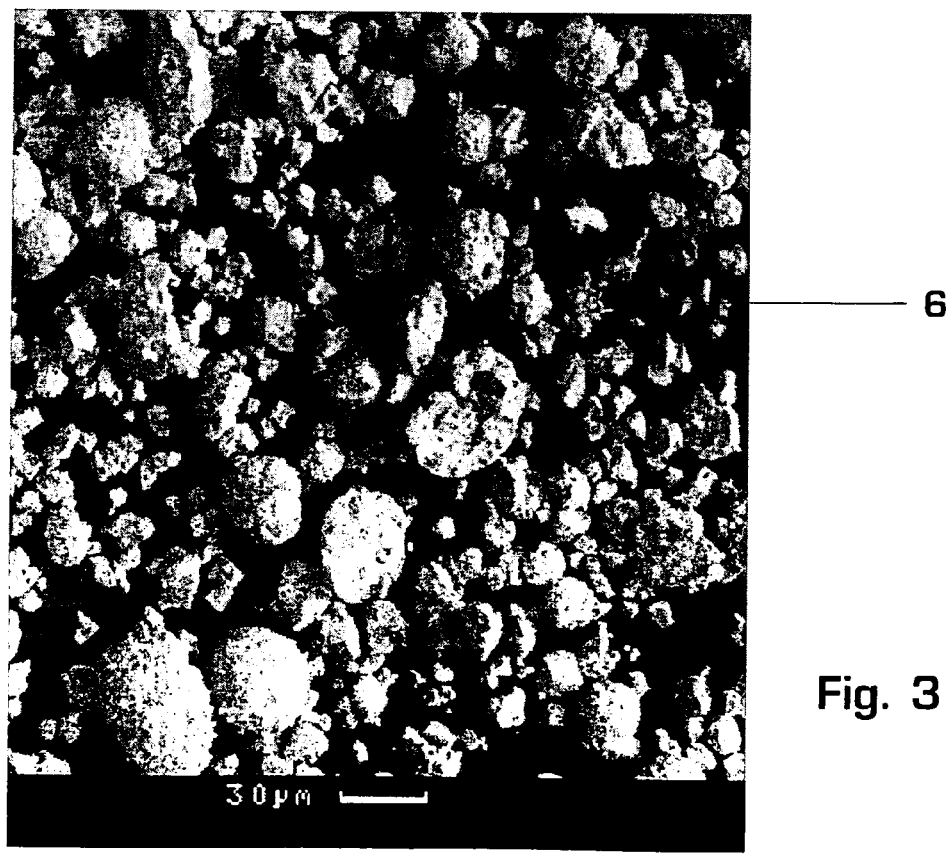

FIG. 3 shows a scanning electron microscope photography of small irregular particles 6 of the second fraction. They have been produced by calcinating or sintering varistor powder and subsequently crushing or fracturing the agglomerated granules with stronger force, such that the initial granules are fractured into particles 6 having irregular, in particular spiky, shapes. Preferably, the particles 6 of the second fraction have largest dimensions smaller than 70 μm, more preferably smaller than 60 μm, particularly preferred smaller than 50 μm.

Advantageously, the particles 5, 6 of the first and second fraction originate from the same calcinated powder. This allows to use different size fractions of the calcinated powder and thus to exploit the powder more economically. In principle it is possible to choose a filler content large enough such that the spherical particles 5 of the first fraction can arrange essentially in the form of a close sphere packing. In practice this need not be the case. The spherical particles 5 shall make at least 50 weight % of the filler content 1'. The filler content 1' shall be between 20 vol % and 70 vol % of the nonlinear electrical material. Particles of a third fraction can be added for tailoring mechanical and/or electrical properties of the nonlinear electrical material. Such particles can be selected from the group of carbon, nanotubes, electro-technical fillers for the polymeric matrix 40, e.g. aluminum hydroxide, high dielectric constant material, e.g. $BaTiO_3$, and/or whiskers, and/or platelets and/or fibers. Other additives like primers or coupling agents (for example silane) and/or stabilizers and/or anti-oxidants (for example $C_{35}H_{62}O_3$) can be added, too.

Figure 4A:
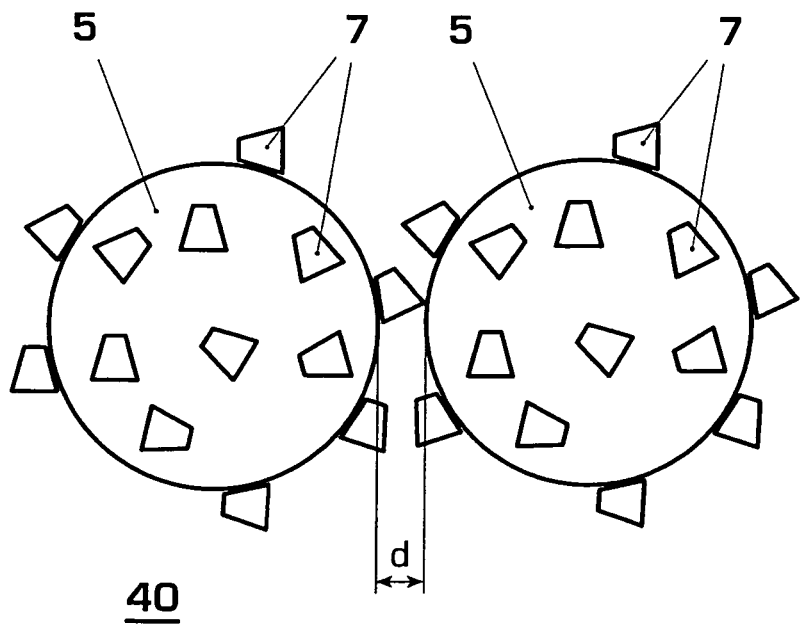
FIGS. 4a, 4b contact improvement by interstitially arranged irregular varistor particles.
Figure 4B:
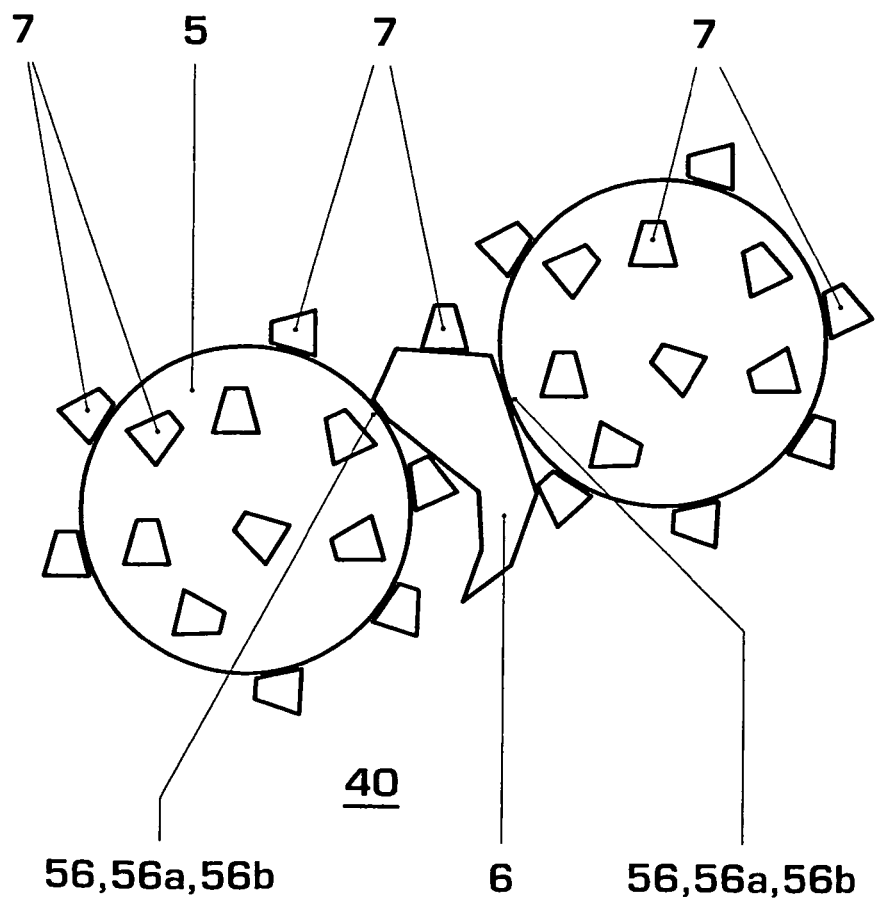

FIG. 4a shows a previously unsolved problem with insulating spinel crystals 7 grown on the surface of the varistor particles 5, 6, here shown on the large spherical particles 5. Such spinel crystals 7 ($Zn_7Sb_2O_{12}$) are electrically non-conductive and occur on most of the commercially available varistors. The spinel crystals 7 can create a minimal distance d between the particles 5 and thus isolate them electrically from each other. The invention, as shown in FIG. 4b, resolves this problem by providing the second fraction of smaller, irregular crystals 6 that can arrange in interstitial positions between the larger spherical particles 5 such that the spinel crystals 7 are bypassed.

The desirable degree of irregularity or non-sphericality of the particles 6 may be specified in terms of their aspect ratio defined as the ratio of largest particle diameter to the smallest perpendicular diameter. The particles 6 of the second fraction shall have irregularities with sufficient aspect ratio for allowing for more contact areas 56a, 56b, 66 and/or a higher filler content 1' compared to spherically shaped particles of comparable particle volume. With advantage, the irregularity shall suffice to bypass insulating spinel crystals 7 that sit on the particle surfaces and space neighbouring particles 5, 6 apart. Typical or predominantly present aspect ratios shall be chosen to be larger than 1.5:1, more preferably larger than 2:1 and particularly preferred larger than 2.5:1.

The invention relates also to an electrical component, for example an electric insulation device, electrical over-voltage device or electrical field control device. Examples are a bushing, surge arrester, pluggable surge arrester, integrated surge arrester for electrostatic discharge protection, varistor, cable, cable accessories, machine insulation, transformer insulation, support insulator, any kind of field control means, which comprises a nonlinear electrical material as disclosed above. As well, an electrical medium or high voltage apparatus, in particular disconnector, breaker, e.g. life tank breaker, dead tank breaker or vacuum breaker, power or distribution transformer, capacitor, inductor, current or voltage transformer, or electrical machine is claimed, which comprises such an electrical component.

In a further aspect the invention relates to a method for producing the nonlinear electrical material according to the preamble of claim 10. According to invention, varistor granules for a second fraction are calcinated or sintered and subsequently crushed such that the granules are fractured into irregularly shaped particles 6, and the spherical particles 5 of the first fraction are selected to have a larger size than the irregular particles 6 of the second fraction such that the irregular particles 6 can fill interstices 40 formed between the spherical particles 5 and can make multiple and/or spatially extended contacts 56, 56a, 56b, 66 with neighbouring particles 5, 6. In the following some preferred production procedures are described.

The granular powder is typically produced by spray drying a slurry comprising ZnO and doping additives. This production step brings about solid or hollow granules or particles with predominantly spherical shape. The green granules are heat treated to obtain microvaristor granules with nonlinear electrical properties. The term calcination refers to a heat treatment of a bed of loose granules which are more or less baked together, typically by forming necks bridging the particles. Alternatively the granules can be calcinated in a rotary kiln, which largely reduces the neck formation. The calcinated agglomerate, and in particular the necks, can be broken-up by using little force only. This preserves the original spherical shape of the coarse particles 5. In contrast, the term sintering relates to a compacted and heat treated fully densified ceramic block. This block must be crushed to get fractured irregular particles 6. The irregular particles 6 can also be obtained from a calcinated powder by feeding the spherical microvaristor powder particles for example through a double-disc mill with a slit smaller than the smallest dimension of the intact particles. The resulting fractured small particles 6 are shown in FIG. 3. In this case, the first and second particle fraction 5, 6 can be taken from the same calcinated powder to economize on the powder. The preferred sizes of the particles 5, 6 are selected typically by sieving.

The process of mixing the microvaristor powder into the polymeric matrix 40 is called compounding. Beforehand, the first and second powder fractions 5 and 6 are produced. According to a preferred embodiment the first and second fraction 5 and 6 are precompounded separately by mixing them separately into two components of a two-component matrix 40. Finally, the components are combined together just before manufacturing of the nonlinear electrical product. Such product manufacturing comprises the step of bringing the nonliner electrical material into the desired geometric shape, which may include any design for example in bulk, tube, sheet, layer or surface cover form. The mixing procedures and the mixing equipment for precompounding the large spherical particles 5 and the small irregular particles 6 may differ. In the case of a one-component polymer matrix 40 the spherical particles 5 and the irregular particles 6 may be mixed separately into two portions of the polymer 40 using different procedures and equipment, if needed, before the two portions are then mixed together. Precompounding is of particular interest, if a third fraction of very fine particles shall be added, such as carbon black or nanopowder. For such fillers, in order to obtain a good dispersion in the matrix 40, an optimised high shear mixer must be used, whereas for larger particle, such as spheroids with diameters of 20 μm to 200 μm, simpler mixers, such as two roll mills, can be used. Separate precompounding allows to apply optimal compounding parameters for each particle fraction 5, 6 depending on particle size and shape. The final compound can finely be tuned by well-controlled mixing of the precompounds. Thus, precompounding can simplify and economize the mixing process and can improve the homogeneity of the mixed product. In another process the first and second powder fraction 5 and 6 are mixed and then compounded into the matrix. The presence of a fraction of spherical particles allows a better mixing and/or processing behaviour as for irregularly shaped filler only.

Further optional processing steps consist in that the particles 5, 6 of the first and/or second fraction are decorated with conducting particles by a surface treatment, in particular by sintering or mechanical fusion of silver flakes, for providing metallic micro-contacts among the particles 5, 6, and/or in that the particles 5, 6 are made more conductive or more resistive owing to a surface treatment, in particular by using metal halide (e.g. $SnF_2$) or peroxide (e.g. $H_2O_2$), respectively. The filler particles 5, 6 may also be treated after calcination in a second heat treatment to improve their long term electrical stability. This effect is related to phase changes in the microvaristor particles 5, 6. As well, the irregular particles 6 of the second fraction can be healed from micro-cracks acquired during crushing or fracturing by performing a further dedicated heat treatment.

The microvaristor particle fractions 5, 6 are typically made of doped ZnO varistor powder showing a nonlinear current-voltage behaviour above a critical field strength. However, there is no limitation to the material choice for the particulate varistor filler 1' and for the matrix 40. Examples for the polymer matrix 40 are: silicones, ethylene-propylene rubber (EPR), ethylene-propylene-diene monomer (EPDM), polyurethane, thermoplastic polymers such as ethylene-vinyl acetate (EVA), polyethylenes or polyamides, thermoplastic elastomer (TPE), duromers such as epoxies, glasses, gels or liquids such as oils. The two particle fractions 5 and 6 can as well be made of different chemical composition (for example, but not limited to, ZnO with different dopings or doped ZnO and doped $SnO_2$).

LIST OF REFERENCE SYMBOLS

1 Spherical particles, spherical filler powder (prior art)
1' Spherical and irregular particles, spherical and irregular filler powder (invention)
2 Large round particles
22 Point contact large-large particles
23 Point contact large-small particles
3 Small round particles
4 Empty space (filled with polymer)
40 Polymer matrix
5 Large spherical particles, first powder fraction
56 Contact round-spiky particles
56a Multiple point contacts round-spiky particles
56b Edge or face contact round-spiky particles
6 Small irregular particles, second powder fraction
66 Edge or face contact spiky-spiky particles
7 Spinel crystals on particle surface
d spacing distance

The invention claimed is:

1. Nonlinear electrical material comprising a polymeric matrix and a particulate varistor filler in powder form and embedded in the matrix, wherein the filler comprises a first fraction of coarse microvaristor particles and a second fraction of fine microvaristor particles, wherein the coarse microvaristor particles have a larger size than the fine microvaristor particles and the fine microvaristor particles can fill interstices formed between the coarse microvaristor particles, and wherein further the coarse microvaristor particles in the first fraction have a predominantly spherical shape, wherein the fine microvaristor particles in the second fraction have irregularly shaped bodies with surfaces comprising edges and/or areal faces for providing non-point-like and/or multiple contact areas of the fine microvaristor particles with neighbouring particles.

2. The nonlinear electrical material as claimed in claim 1, wherein the contact areas comprise multiple point contacts and/or at least one edge and/or at least one face contact among neighbouring microvaristor particles.

3. The nonlinear electrical material as claimed in claim 1, wherein
   a) the microvaristor particles for the first fraction have been calcinated and subsequently separated, in particular broken up, such that the microvaristor particles retain their original, predominantly spherical shape and/or
   b) the microvaristor particles for the second fraction have been produced by calcinating or sintering and subsequently fracturing such that the microvaristor particles have irregular, in particular spiky, shapes and/or
   c) the microvaristor particles of the second fraction are obtained by crushing varistor blocks.

4. The nonlinear electrical material as claimed in claim 1, wherein
   a) the microvaristor particles of the first and second fraction originate from the same calcinated powder or
   b) the microvaristor particles of the first and second fraction have different chemical composition.

5. The nonlinear electrical material as claimed in claim 1, wherein
   a) the microvaristor particles of the first fraction make at least 50 weight % of the filler content and/or
   b) the filler content is 20 vol to 70 vol % of the nonlinear electrical material and/or
   c) particles of a third fraction are added for tailoring mechanical and/or electrical properties of the nonlinear electrical material, which particles are selectable from the group of carbon, nanotubes, electrotechnical fillers for the polymeric matrix, such as aluminum hydroxide, high dielectric constant material, such as $BaTiO_3$, and/or whiskers, and/or platelets and/or fibers, and/or
   d) the nonlinear electrical material comprises a primer and/or a stabilizer and/or an antioxidant.

6. The nonlinear electrical material as claimed in claim 1, wherein
   a) the microvaristor particles of the first fraction have diameters of 90 µm to 160 µm, and/or
   b) the particles of the second fraction have largest dimensions smaller than 70 µm.

7. The nonlinear electrical material as claimed in claim 1, wherein
   a) the microvaristor particles of the second fraction have irregularities with sufficient aspect ratio for allowing for more contact areas and/or a higher filler content compared to spherically shaped particles of comparable particle volume and/or b) the microvaristor particles of the second fraction have irregularities with sufficient aspect ratio for bypassing insulating spinel crystals that sit on the microvaristor particle surfaces of the first fraction and space neighbouring particles apart.

8. At least one of an electrical component in form of a bushing, surge arrester, pluggable surge arrester, integrated surge arrester for electrostatic discharge protection, varistor, cable, cable accessories, machine insulation, transformer insulation, support insulator, or field control means, formed at least in part from the nonlinear electrical material according to claim 1.

9. At least one of a disconnector, breaker, such as life tank, dead tank or vacuum breaker, power or distribution transformer, capacitor, inductor, instrument transformer, or electrical machine formed at least in part from an electrical component according to claim 8 is present.

10. Method for producing a nonlinear electrical material according to claim 1, the nonlinear electrical material being formed by embedding a particulate varistor filler in powder form in a polymeric matrix, wherein particles of a first fraction of coarse microvaristor are calcinated and subsequently broken up such that the particles retain their original, predominantly spherical shape, and particles of different fractions are mixed, wherein a) granules for a second of fine microvarsitor fraction are calcinated or sintered and subsequently crushed such that the granules are fractured into irregularly shaped particles, and b) the spherical particles of the first fraction are selected to have a larger size than the irregular particles of the second fraction such that the irregular particles can fill interstices formed between the spherical particles and can make multiple and/or spatially extended contacts with neighbouring particles.

11. Method for producing a nonlinear electrical material as claimed in claim 10, wherein a) more than 50 weight % of the filler is selected from the spherical particles and/or b) the filler content is chosen between 20 vol % and 70 vol % of the nonlinear electrical material.

12. Method for producing a nonlinear electrical material as claimed in claim 10, wherein a) the spherical particles are selected, in particular sieved, with diameters ranging from 90 µm to 160 µm, in particular from 100 µm to 150 µm, and/or b) the irregular particles are selected, in particular sieved, with largest dimensions smaller than 70 µm, preferably smaller than 60 µm, particularly preferred smaller than 50 µm and/or the particles for the first and second fraction are taken from the same calcinated powder or the particles of the first and second fraction have different chemical composition, and/or c) the particles of the second fraction are obtained from varistor blocks.

13. Method for producing a nonlinear electrical material as claimed in claim 10, wherein the spherical particles and the irregular particles are precompounded separately by mixing them separately into two components of a two-component matrix or into two portions of a one-component matrix.

14. Method for producing a nonlinear electrical material as claimed in claim 10, wherein the particles of the first and/or second fraction a) are decorated with conducting particles by a surface treatment, in particular by sintering or mechanical fusion of silver flakes, for providing metallic micro-contacts among the particles, and/or b) are made more conductive or more resistive owing to a surface treatment, in particular by using metal halides or peroxides, respectively.

15. Method for producing a nonlinear electrical material as claimed in claim 10, wherein a) the filler particles are treated after calcination in a second heat treatment to improve their long term electrical stability, and/or b) the particles of the second fraction are healed from micro-cracks acquired during fracturing by a further heat treatment.

16. The nonlinear electrical material of claim 6, wherein
 a) the microvanistor particles of the first fraction have diameters of 100 µm to 150 µm; and/or b) the microvanistor particles of the second fraction have largest dimensions smaller than 60 µm.

17. The nonlinear electrical material of claim 16, wherein the microvanistor particles of the second fraction have largest dimensions smaller than 50 µm.

18. The nonlinear electrical material of claim 7, wherein the aspect ratio is greater than 1.5:1.

19. The nonlinear electrical material of claim 18, wherein the aspect ratio is greater than 2:1.

20. The nonlinear electrical material of claim 19, wherein the aspect ratio is greater than 2.5:1.

21. The nonlinear electrical material of claim 1, wherein electrical contacts are formed by the non-point-type and/or multiple contact areas between the varistor particles.

22. The nonlinear electrical material of claim 1, wherein the material has a nonlinearity coefficient $\alpha_\beta \geq 25$.

* * * * *

UNITED STATES PATENT AND TRADEMARK OFFICE
CERTIFICATE OF CORRECTION

PATENT NO.        : 7,651,636 B2                                                Page 1 of 1
APPLICATION NO. : 11/086907
DATED             : January 26, 2010
INVENTOR(S)       : Gramespacher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Twenty-third Day of November, 2010

David J. Kappos
*Director of the United States Patent and Trademark Office*